United States Patent [19]
Baumgart et al.

[11] Patent Number: 5,574,605
[45] Date of Patent: Nov. 12, 1996

[54] ANTIFERROMAGNETIC EXCHANGE COUPLING IN MAGNETORESISTIVE SPIN VALVE SENSORS

[75] Inventors: Peter M. Baumgart, San Jose, Calif.; Bernard Dieny, Grenoble Credex, France; Bruce A. Gurney, Santa Clara, Calif.; Virgil S. Speriosu, San Jose, Calif.; Dennis R. Wilhoit, Morgan Hill, Calif.

[73] Assignee: International Business Machines Corporation, Armonk, N.Y.

[21] Appl. No.: 560,175

[22] Filed: Nov. 17, 1995

Related U.S. Application Data

[63] Continuation of Ser. No. 470,651, Jun. 6, 1995, abandoned, which is a continuation of Ser. No. 263,158, Jun. 20, 1994, abandoned, which is a continuation of Ser. No. 937,620, Aug. 28, 1992, abandoned.

[51] Int. Cl.$^6$ ................................................ G11B 5/39
[52] U.S. Cl. ............................ 360/113; 29/603.16
[58] Field of Search ................................ 360/113, 126; 338/32 R; 324/252; 29/603.16

[56] References Cited

U.S. PATENT DOCUMENTS

| | | | |
|---|---|---|---|
| 4,103,315 | 6/1978 | Hempstead et al. | 360/113 |
| 4,755,897 | 6/1988 | Howard | 360/113 |
| 4,785,366 | 11/1988 | Krounbi et al. | 360/113 |
| 4,949,039 | 8/1990 | Grunberg | 324/252 |
| 5,005,096 | 4/1991 | Krounbi et al. | 360/113 |
| 5,060,100 | 10/1991 | Mihara et al. | 360/98.01 |
| 5,159,513 | 10/1992 | Dieny et al. | 360/113 |
| 5,341,261 | 8/1994 | Dieny et al. | 360/113 |

FOREIGN PATENT DOCUMENTS 0314343  10/1988  United Kingdom.

OTHER PUBLICATIONS

D. A. Thompson, et al., "Thin Film Magnetoresistors in Memory, Storage, and Related Applications", IEEE Trans. Mag. MAG-11, p. 1039 (1975).

*Primary Examiner*—Stuart S. Levy
*Assistant Examiner*—William R. Korzuch
*Attorney, Agent, or Firm*—Leslie G. Murray

[57] ABSTRACT

A magnetoresistive read sensor based on the spin valve effect in which a component of the read element resistance varies as the cosine of the angle between the magnetization directions in two adjacent magnetic layers is described. The sensor read element includes two adjacent ferromagnetic layers separated by a nonmagnetic metallic layer. A layer of antiferromagnetic material is formed over one of the ferromagnetic layers to provide an exchange bias field which fixes or "pins" the magnetization direction in the one ferromagnetic layer. An interlayer of magnetically soft material is deposited between the ferromagnetic and antiferromagnetic layers separating the ferromagnetic layer from the antiferromagnetic layer and enhancing the exchange coupling, particularly in the instance where the ferromagnetic material is iron or an iron alloy.

19 Claims, 7 Drawing Sheets

ANTIFERROMAGNETIC EXCHANGE COUPLING IN MAGNETORESISTIVE SPIN VALVE SENSORS

This is a continuation of application Ser. No. 08/470,651 filed on Jun. 6, 1995, now abandoned, which is a continuation of application Ser. No. 08/263,158, filed on Jun. 20, 1994 now abandoned, which is a continuation of application Ser. No. 07/937,620 filed on Aug. 28, 1992, now abandoned.

BACKGROUND OF THE INVENTION

The present invention relates generally to magnetic transducers for reading information signals recorded in a magnetic medium and, more particularly, to an improved magnetoresistive read transducer utilizing antiferromagnetic exchange coupling to provide a longitudinal bias field for the transducer.

The prior art discloses a magnetic read transducer referred to as a magnetoresistive (MR) sensor or head which has been shown to be capable of reading data from a magnetic surface at great linear densities. An MR sensor detects magnetic field signals through the resistance changes of a read element fabricated of a magnetic material as a function of the strength and direction of magnetic flux being sensed by the read element. These prior art MR sensors operate on the basis of the anisotropic magnetoresistive (AMR) effect in which a component of the read element resistance varies as the square of the cosine ($cos^2$) of the angle between the magnetization and the direction of sense current flow through the element. A more detailed description of the AMR effect can be found in "Memory, Storage, and Related Applications", D. A. Thompson et al., IEEE Trans. Mag. MAG-11, p. 1039 (1975).

U.S. Pat. No. 4,949,039 to Grunberg describes a layered magnetic structure which yields enhanced MR effects caused by antiparallel alignment of the magnetizations in the magnetic layers. As possible materials for use in the layered structure, Grunberg lists ferromagnetic transition metals and alloys, but does not indicate preferred materials from the list for superior MR signal amplitude. Grunberg further describes the use of antiferromagnetic-type exchange coupling to obtain the antiparallel alignment in which adjacent layers of ferromagnetic materials are separated by a thin interlayer of Cr or Y.

Co-pending U.S. patent application Ser. No. 07/625,343 filed Dec. 11, 1990, now U.S. Pat. No. 5,206,590, assigned to the instant assignee, discloses an MR sensor in which the resistance between two uncoupled ferromagnetic layers is observed to vary as the cosine of the angle between the magnetizations of the two layers and which is independent of the direction of current flow through the sensor. This mechanism produces a magnetoresistance that, for selected combinations of materials, is greater in magnitude than the AMR, and is referred to as the "spin valve" (SV) magnetoresistance. Co-pending U.S. patent application Ser. No. 07/652,852, filed Feb. 8, 1991, now U.S. Pat. No. 159,153, assigned to the instant assignee, discloses an MR sensor based on the above-described effect which includes two thin film layers of ferromagnetic material separated by a thin film layer of a non-magnetic metallic material wherein at least one of the ferromagnetic layers is of cobalt or a cobalt alloy. The magnetization of the one ferromagnetic layer is maintained perpendicular to the magnetization of the other ferromagnetic layer at zero externally applied magnetic field by exchange coupling to an antiferromagnetic layer.

SUMMARY OF THE INVENTION

In accordance with the principles of the present invention, an MR read sensor based on the spin valve effect comprises a layered structure formed on a suitable substrate including first and second thin film layers of a ferromagnetic material separated by a thin film layer of non-magnetic metallic material, with at least one of the layers of ferromagnetic material formed of a material taken from the group consisting of iron and iron alloys. The magnetization direction of the first layer of ferromagnetic material is substantially perpendicular to the magnetization direction of the second layer of ferromagnetic material at zero externally applied magnetic field. The magnetization direction in the one iron or iron alloy ferromagnetic layer is constrained or maintained in its direction by antiferromagnetic exchange coupling provided by an adjacent antiferromagnetic layer across a thin magnetically soft interlayer. The iron ferromagnetic layer and the magnetically soft interlayer form a bilayer in which the magnetization direction or orientation is essentially fixed. The direction of the magnetization in the other ferromagnetic layer is free to rotate in response to an externally applied magnetic field. A current source provides a sense current to the MR sensor which generates a voltage drop across the read element proportional to the variations in the resistance of the MR sensor due to the rotation of the magnetization in the free layer of ferromagnetic material as a function of the applied external magnetic field being sensed. The magnitude of the resistance change of the read element is a function of the cosine of the change of the angle between the direction of magnetization in the free layer and the direction of the magnetization in the fixed layer in response to an externally applied magnetic field such as that representative of a data bit stored in magnetic media.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
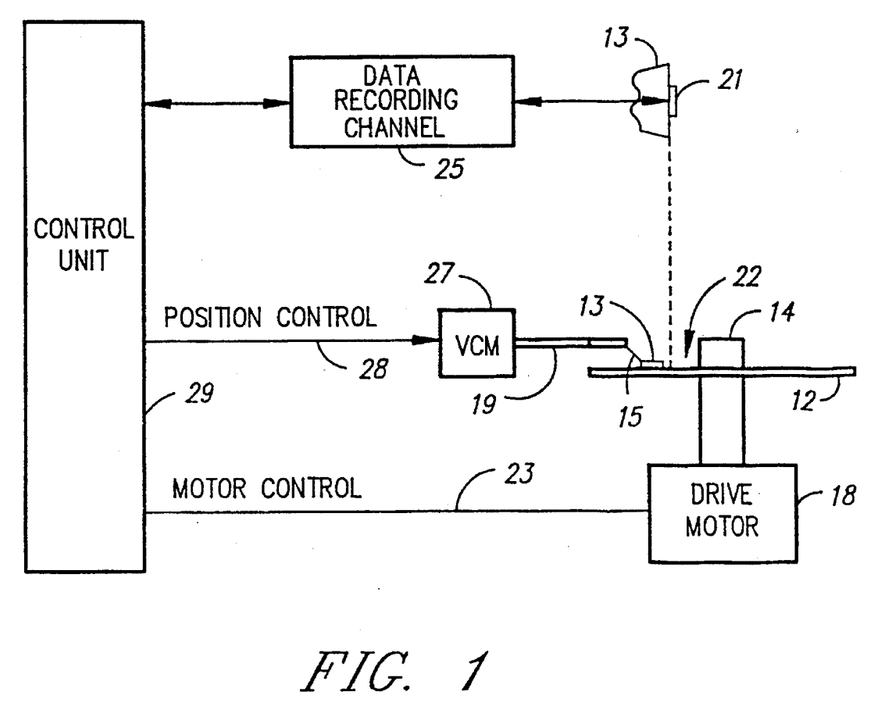
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example. At least one rotatable magnetic disk 12 is supported on a spindle 14 and rotated by a disk drive motor 18. The magnetic recording media on each disk is in the form of an annular pattern of concentric data tracks (not shown) on disk 12.

At least one slider 13 is positioned on the disk 12, each slider 13 supporting one or more magnetic read/write transducers 21, typically referred to as read/write heads. As the disks rotate, the sliders 13 are moved radially in and out over the disk surface 22 so that the heads 21 may access different portions of the disk where desired data is recorded. Each slider 12 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity f the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
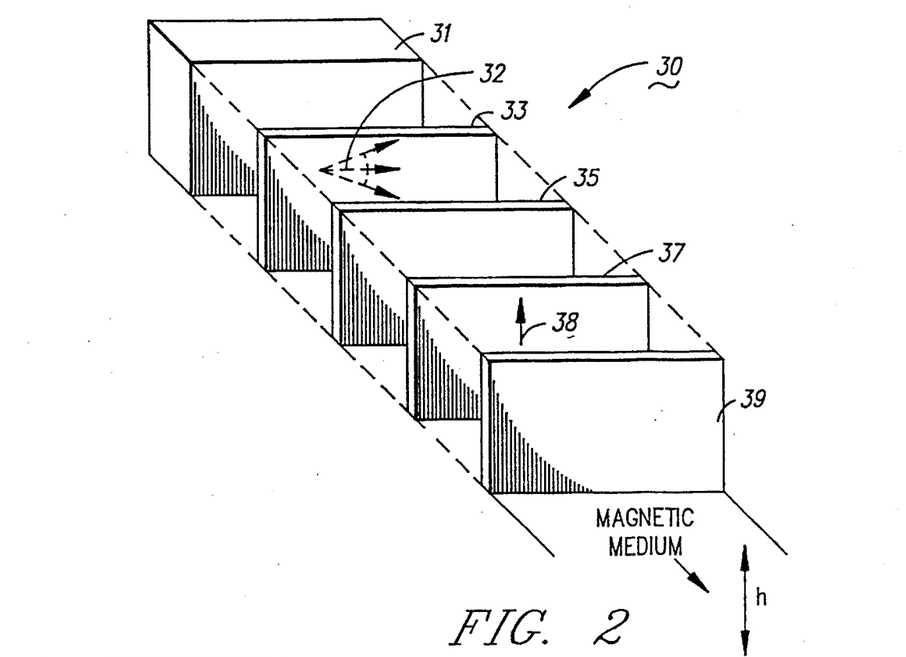
FIG. 2 is an exploded view in perspective of a preferred embodiment of the magnetoresistive sensor according to the principles of the present invention.

Referring now to FIG. 2, an MR sensor 30 according to the principles of the present invention comprises a suitable substrate 31 such as glass, ceramic or a semiconductor, for example, upon which is deposited a first thin film layer 33 of soft ferromagnetic material, a thin film layer 35 of a non-magnetic metallic material and a second thin film layer 37 of ferromagnetic material. The magnetizations of the two layers 33, 37 of ferromagnetic material are oriented at an angle of about 90 degrees with respect to each other as indicated by arrows 32 and 38 in the absence of an externally applied magnetic field. In addition, the magnetization direction of the second layer 37 of ferromagnetic material is fixed or pinned in a preferred orientation as shown by the arrow 38. Thus, while the magnetization direction of the second ferromagnetic layer 37 remains fixed, the magnetization in the first layer 33 of ferromagnetic material is free to rotate its direction in response to an externally applied magnetic field (such as magnetic field h as shown in FIG. 2), as shown by the dashed arrows on layer 33 in FIG. 2.

A thin film layer 39 of an exchange biasing material having relatively high electrical resistance is deposited in direct contact with the second thin film layer 37 of ferromagnetic material to provide a biasing field by exchange coupling. In the preferred embodiment layer 39 comprises a suitable antiferromagnetic material, preferably iron-manganese (FeMn) or nickel-manganese (NiMn), for example. Alternatively, the structure shown in FIG. 2 may be deposited in inverted order, such that the antiferromagnetic layer 39 is deposited first, followed, in order, by layers 37, 35 and 33. In this inverted structure, a seed layer can be used to insure that the antiferromagnetic layer 39 has the desired structure.

According to this preferred embodiment of the present invention, one or both of the ferromagnetic layers 33, 37 comprises either iron(Fe) or an iron alloy. The non-magnetic metallic spacer layer 35 comprises copper (Cu), for example, or other suitable noble metal such as silver (Ag) or gold (Au) or their alloys. An MR sensor based on the spin valve effect wherein the sensor read elements comprises the ferromagnetic/non-magnetic/ferromagnetic layered structure is described in greater detail in the above referenced patent application Ser. No. 07/625,343 hereby incorporated by reference as if fully set forth herein. The fixed Fe or Fe alloy layer 37 can be exchanged biased by a layer 39 of FeMn, for example, wherein the magnitude of the exchange bias is greatly increased by the use of a field annealing process as will be described in greater detail below.

Figure 3:
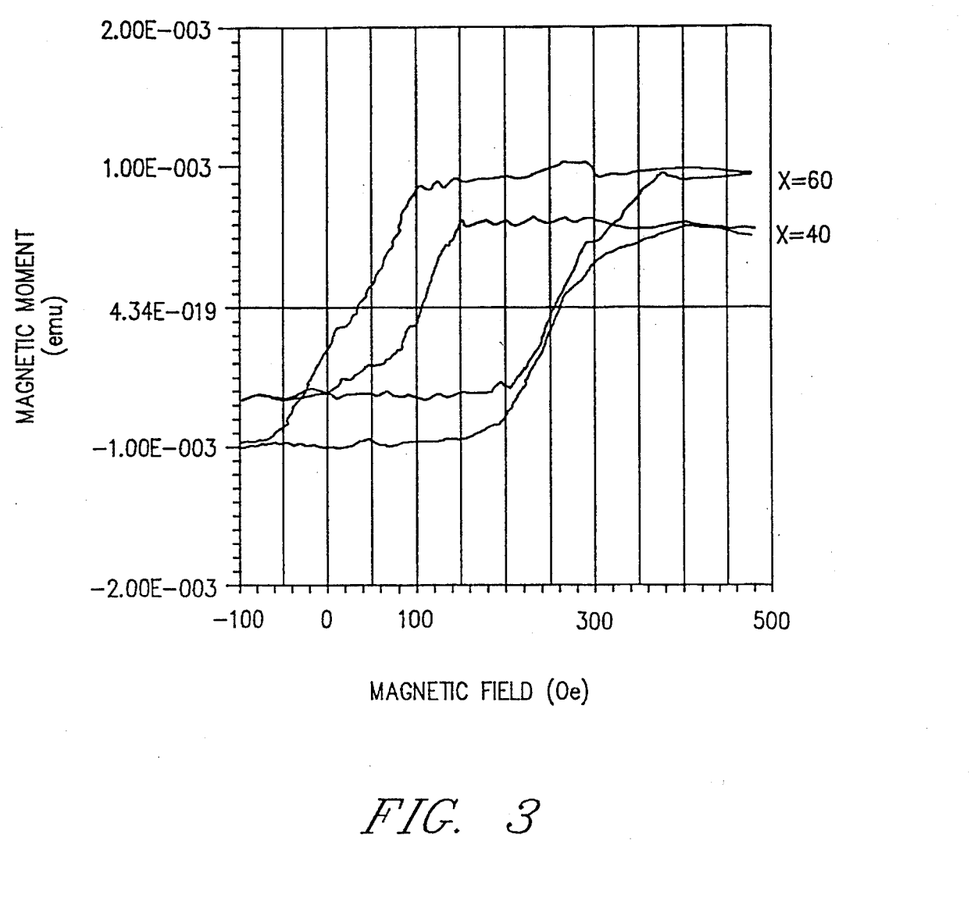
FIG. 3 is a graph which illustrates the hysteresis loop for the embodiment of the magnetoresistive sensor shown in FIG. 2.

In MR sensors utilizing a spin valve structure it is desirable to maximize the exchange anisotropy. For an optimal MR sensor based on the spin valve effect, the fixed, or "pinned", layer 37 must remain nearly saturated over the range of the magnetic field that is to be sensed. FIG. 3 illustrates the exchange coupling bias field for thin films of Fe overlayed with a thin film of FeMn deposited on polished Si wafers. In particular, thin films having the structure Si/V(30 Å)/Fe(X)/FeMn(150 Å)/V(100 Å) with X=40 Å and 60 Å exhibit exchanges of about 30 Oe, corresponding to an exchange energy of about 0.02 erg-cm$^{-2}$, in as-deposited films. When the films are annealed in air at 180 degrees C. for about 10 minutes and allowed to cool in an applied magnetic field of about 250 Oe or more, the exchange field increases substantially to about $H_{exch}$ of 135 and 150 Oe, respectively, corresponding to an exchange interaction free energy of about 0.1 erg-cm$^{-2}$. The exchange anisotropy of annealed Fe/FeMn films is about as large as that of NiFe/FeMn and is sufficient for MR sensor application.

Figure 4:
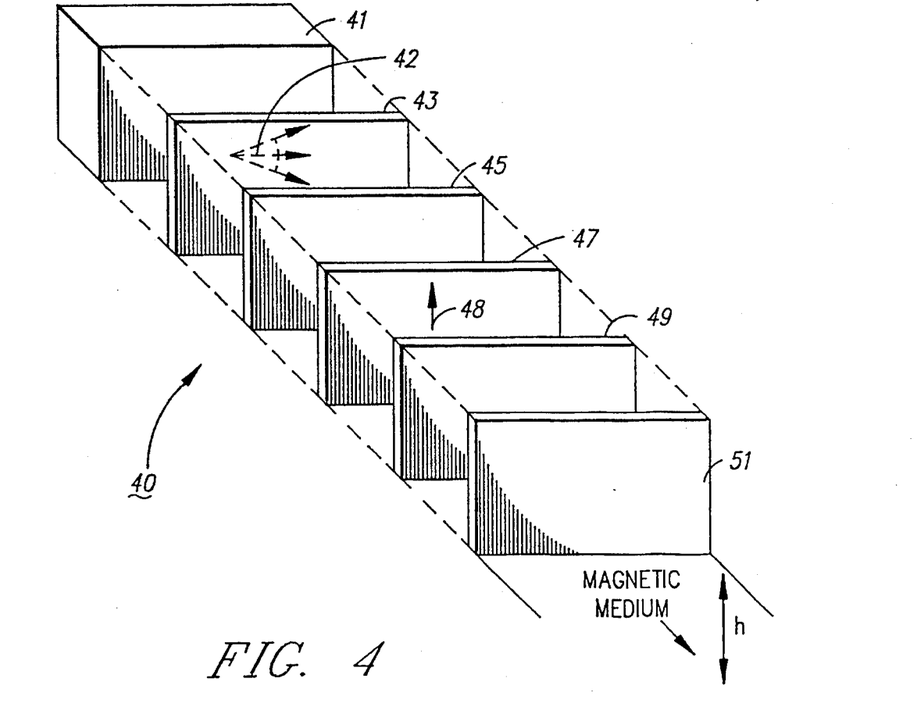
FIG. 4 is an exploded view in perspective of an alternate embodiment of the magnetoresistive sensor according to the principles of the present invention.
Figure 5A:
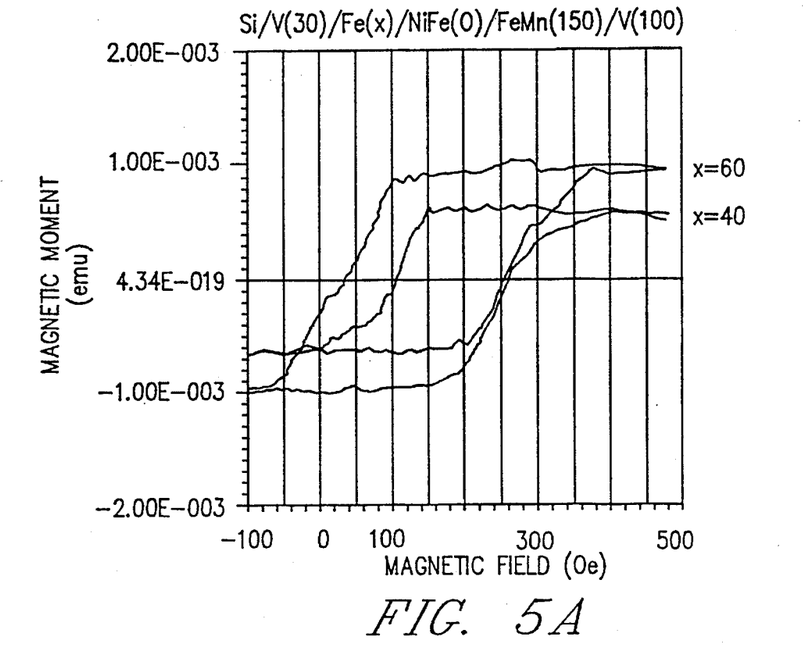
FIGS. 5a–5d are graphs which illustrate the hysteresis loop for various structures implementing the magnetoresistive sensor shown in FIG. 4.
Figure 5B:
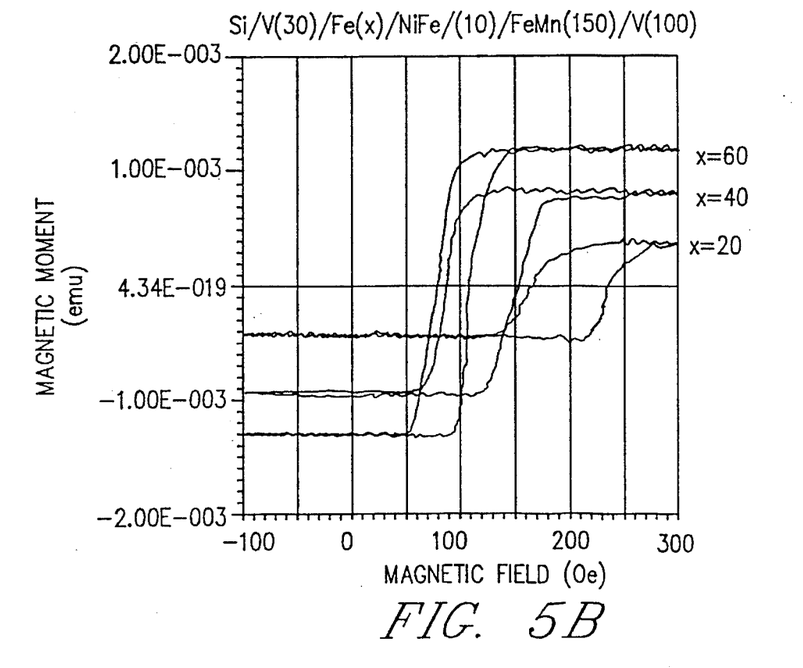
Figure 5C:
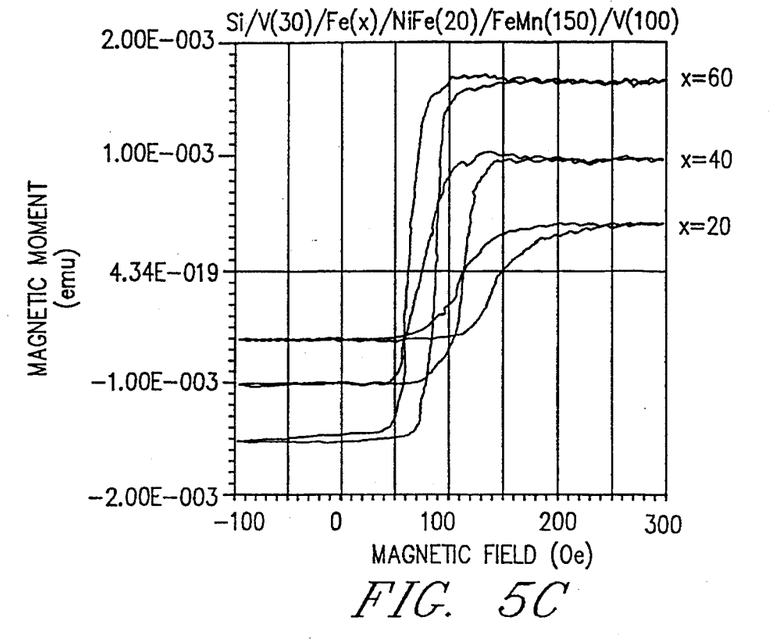
Figure 5D:
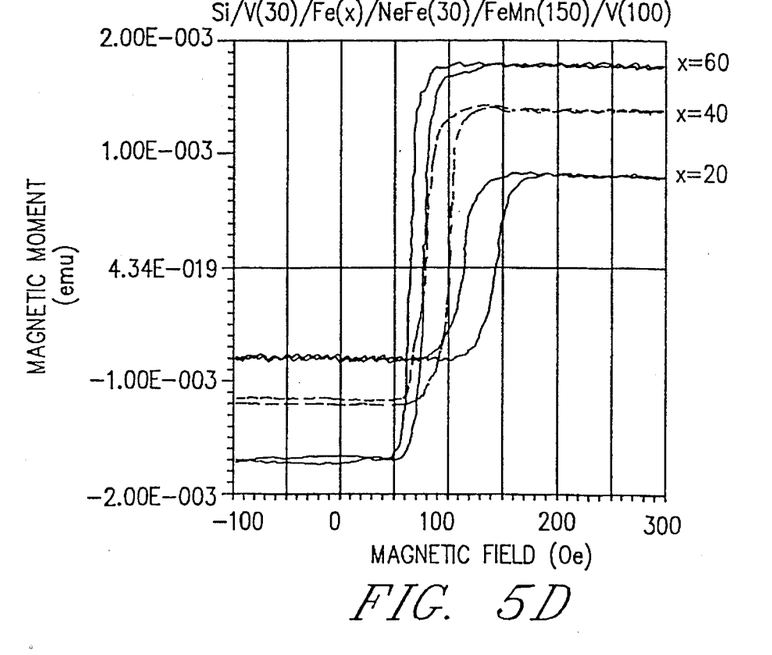

Referring now also to FIG. 4, an MR sensor 40 according to the principles of the present invention comprises a suitable substrate 41 such as glass, ceramic or a semiconductor, for example, upon which is deposited a first thin film layer 43 of soft ferromagnetic material, a thin film layer 45 of a non-magnetic metallic material and a second thin film layer 47 of ferromagnetic material. The magnetizations of the two layers 43, 47 of ferromagnetic material are oriented at an angle of about 90 degrees with respect to each other as indicated by arrows 42 and 48 in the absence of an externally applied magnetic field. In addition, the magnetization direction of the second layer 47 of ferromagnetic material is fixed or pinned in a preferred orientation as shown by the arrow 48. While the magnetization direction of the second ferromagnetic layer 47 is fixed, the magnetization in the first layer 43 of ferromagnetic material is free to rotate its direction in response to an externally applied magnetic field (such as magnetic field h as shown in FIG. 4), as shown by dashed arrows on layer 43 in FIG. 4.

A thin film layer 51 of an antiferromagnetic material having relatively high electrical resistance is deposited adjacent to the second thin film layer 47 of ferromagnetic material to provide an exchange bias field in the second layer 47. A magnetically soft layer 49 is deposited between the second ferromagnetic layer 47 and exchange bias layer 51, separating the exchange bias layer 51 from the second ferromagnetic layer 47. In the preferred embodiment layer 51 comprises a suitable antiferromagnetic material, preferably FeMn or NiMn, for example. Alternatively, the structure shown in FIG. 4 may be deposited in inverted order, such that the antiferromagnetic layer 51 is deposited first, followed, in order, by layers 49, 47, 45 and 43. In this inverted structure, a seed layer may first be deposited prior to deposition of the antiferromagnetic layer 51 to insure that the antiferromagnetic layer has the desired structure.

According to this preferred embodiment of the present invention as shown in FIG. 4, one or both of the ferromagnetic layers 43, 47 comprises either iron(Fe) or an iron alloy. Preferably, the ferromagnetic layer 47 adjacent the exchange bias layer 51 will be of Fe or an Fe alloy and have a thickness in the range of 10 to 100 angstroms (Å). The magnetically soft separation layer or interlayer 49 preferably has a thickness of 10 Å or greater, in the range of 10 to 40 Å. The non-magnetic metallic spacer layer 45 comprises Cu, for example, or other suitable noble metal such as Ag or Au or their alloys. The thickness of the metallic spacer layer 45 is sufficiently great to ensure substantial magnetic decoupling of the two ferromagnetic layers 43, 47 but still thin enough to be less than the mean free path length of the conduction electrons. The second ferromagnetic layer 47 and the magnetically soft interlayer 49 form a bilayer in which the magnetization direction is fixed by exchange coupling to the antiferromagnetic layer 51.

Figure 6:
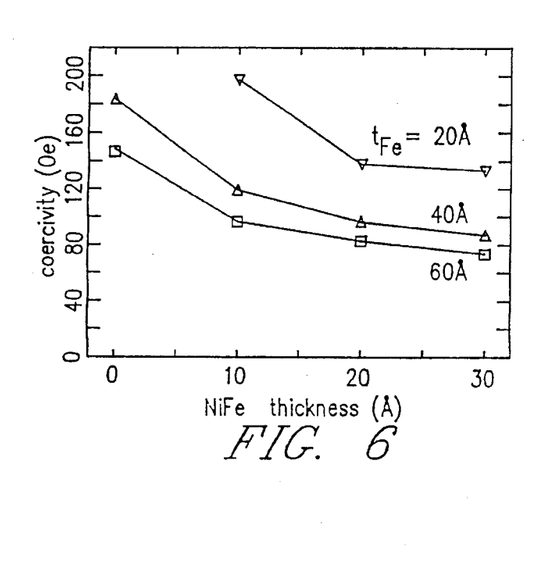
FIG. 6 is a graph which illustrates the exchange field versus the magnetically soft interlayer thickness for the magnetoresistive sensor shown in FIG. 4.
Figure 7:
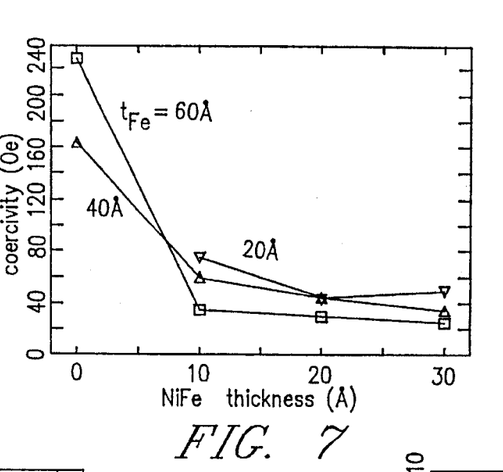
FIG. 7 is a graph which illustrates the coercivity field versus the magnetically soft interlayer thickness for the magnetoresistive sensor shown in FIG. 4.
Figure 8:
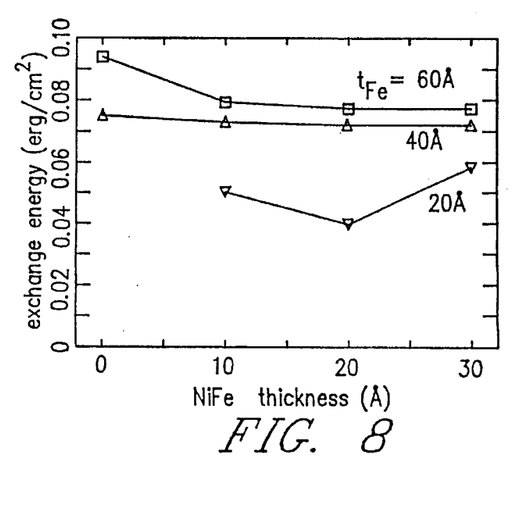
FIG. 8 is a graph which illustrates the exchange energy versus the magnetically soft interlayer thickness for the magnetoresistive sensor shown in FIG. 4.

A specific embodiment of the MR spin valve sensor 40 as shown in FIG. 4 comprises an Fe ferromagnetic layer 47 and an FeMn antiferromagnetic layer 51 separated by a NiFe magnetically soft layer 49 sputter deposited on a polished silicon (Si) substrate. FIGS. 5a–5d are plots of the hysteresis (M-H) loops for the structures after annealing in air and cooling in a magnetic field as described above with reference to FIGS. 2 and 3. In particular, the structures investigated were Si/V(30 Å)/Fe(x)/Ni$_{80}$Fe$_{20}$(y)/Fe$_{50}$Mn$_{50}$(150 Å)/V(100 Å) where x and y are the thickness of the ferromagnetic layer 47 and of the magnetically soft layer 49, respectively. For magnetically soft layer thicknesses y=0, 10, 20 and 30 Å, the M-H loops for ferromagnetic layer thicknesses x=20, 40 and 60 Å are shown in FIGS. 5a–5d. The variation of the exchange field ($H_{exch}$), the coercivity ($H_c$) and the interfacial coupling energy ($A=H_{exch}M_s t$), where $M_s$ is the saturation magnetization and t is the ferromagnetic layer thickness, are plotted in FIGS. 6–8, respectively. For all samples, the loop squareness did not vary, being a value of approximately s=0.6. Similarly, the coercive squareness did not vary other the samples, being a value of approximately $s^x$=0.8. When the measured magnetizations of the different layers are taken into account, FIG. 8 shows that the magnitude of the exchange energy can be maintained at approximately 0.08 erg/cm$^2$ for Fe thickness equal to or greater than 40 Å and NiFe thicknesses equal to or greater than 10 Å. This value of interfacial exchange energy is comparable to that obtained with NiFe/FeMn exchange films (typically approximately 0.1 erg/cm$^2$). However, the significantly lower ferromagnetic film coercivities allow the pinned ferromagnetic layer to be maintained in a nearly saturated state over a maximum externally applied field ranging from 50–200 Oe as a function of the Fe and NiFe layer thicknesses. Overall, the insertion of a magnetically soft layer to separate the ferromagnetic and antiferromagnetic layers has significantly improved the magnetic properties of Fe/FeMn exchange coupled films without significantly affecting the magnitude of the exchange field or of the ferromagnetic film squareness or coercive squareness. In particular, use of a magnetically soft interlayer extends the range of the externally applied magnetic field over which the described structures will act as an efficient magnetoresistive sensor.

Figure 9:
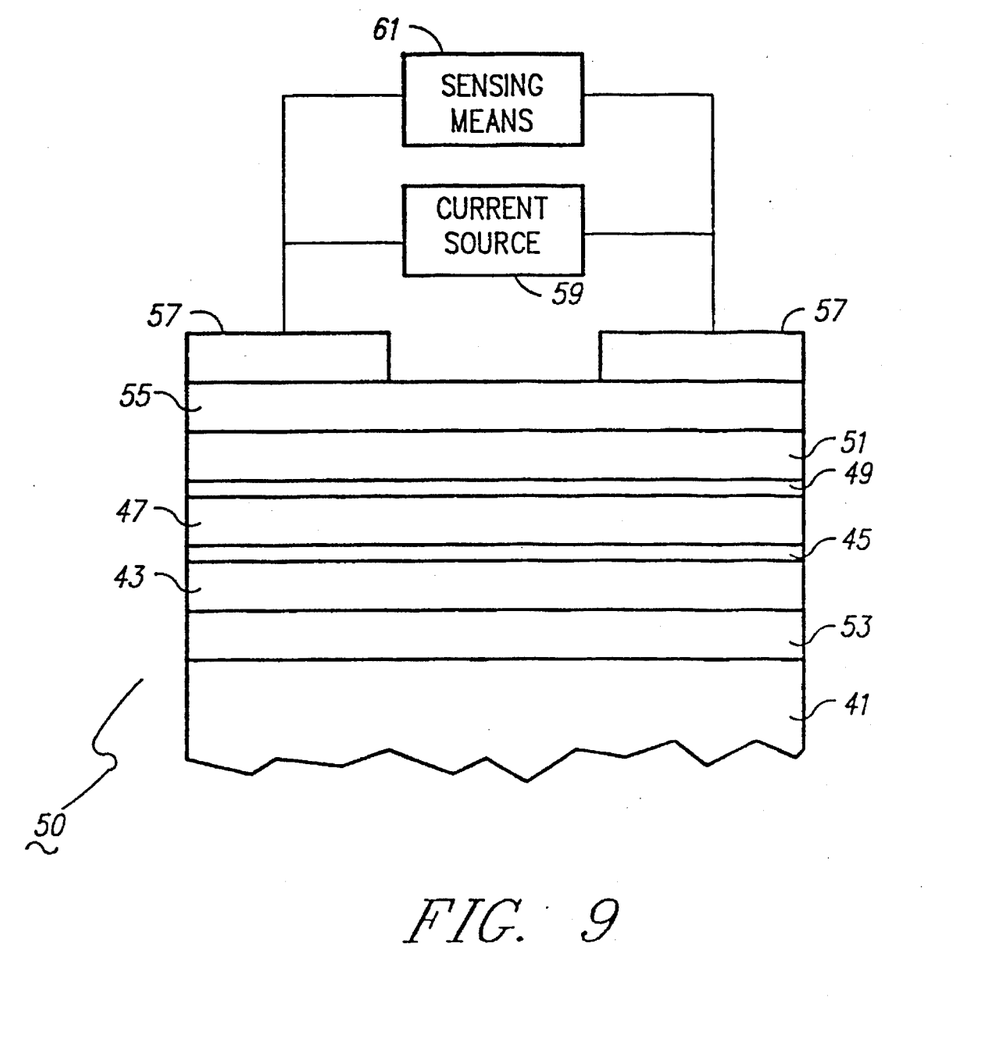
FIG. 9 is an end view of another embodiment of a magnetoresistive sensor constructed in accordance with the present invention.

Referring now to FIG. 9, a further embodiment of the MR spin valve sensor according to the present invention is shown. A suitable underlayer 53, such as Ta, Ru or CrV, for example, is deposited on substrate 41 prior to the deposition of a first ferromagnetic layer 43. The purpose of underlayer 53 is to optimize the texture, grain size and morphology of the subsequent layers. The morphology can be crucial in obtaining the large MR effects characteristic of spin valve structures since it permits the use of a very thin nonmagnetic metallic spacer layer 45 between the two ferromagnetic layers 43 and 45. The underlayer must also have a high resistivity to minimize electrical current shunting effects. The underlayer 53 may also be used with the inverted structures described above with reference to FIGS. 2 and 4. Should the substrate 41 be of a material having a sufficiently high resistivity, have a sufficiently planar surface and have a suitable crystallographic structure, the underlayer 53 can be omitted.

A first thin film layer 43 of soft ferromagnetic material, a thin film layer 45 of a nonmagnetic metallic material and a second thin film layer 47 of a ferromagnetic material are deposited over underlayer 53. The two ferromagnetic layers 43, 47 have their magnetizations oriented at an angle of approximately 90 degrees with respect to each other in the absence of an applied magnetic field. As described above, the magnetization direction of the second layer 47 of ferromagnetic material is pinned in position by a biasing field produced by exchange coupling. A thin film layer 49 of a magnetically soft material, such as NiFe, for example, is deposited directly over the second ferromagnetic layer 47 followed by a layer 51 of antiferromagnetic material deposited directly over the magnetically soft layer 49. The second ferromagnetic layer 47 and the magnetically soft interlayer 49 form a bilayer in which the direction of the magnetization is fixed by exchange coupling to the antiferromagnetic layer 51.

The ferromagnetic layer 43, 47 can be of fabricated of any suitable magnetic material such as Co, Fe, Ni and their alloys such as NiFe, NiCo and FeCo, for example. Preferably, the second ferromagnetic layer 47 in contact with the magnetically soft layer 49 be made of Fe or an Fe alloy. The thickness of the ferromagnetic layers 43, 47 can be selected from a range of about 10 Å to about 150 Å.

As discussed above, the exchange bias layer 51 is preferably a layer of antiferromagnetic FeMn having a thickness within the range of about 50 Å to about 150 Å and is in contact with the magnetically soft layer 49 of NiFe having a thickness in the range of about 10 A to about 40 Å.

The nonmagnetic spacer layer 45 is preferably metallic with high conductivity. Noble materials such as Au, Ag and Cu provide large MR response, Pt and Pd provide small MR response, while Cr and Ta exhibit very little MR response. For reasons discussed above, the thickness of the spacer layer 45 is preferably within the range of about 10 Å to about 40 Å.

A capping layer 55 of a high resistivity material such as Ta or Zr, for example, is then deposited over the MR sensor. Electrical leads 57 are provided to form a circuit path between the MR sensor and a current source 59 and a sensing means 61.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A magnetoresistive sensor comprising:
    a first and a second layer of ferromagnetic material separated by a spacer layer of nonmagnetic metallic material, said second ferromagnetic layer being of iron, the magnetization direction of said first layer of ferromagnetic material being substantially perpendicular to the magnetization direction of said second layer of ferromagnetic material at zero applied magnetic field;
    a layer of magnetically soft material adjacent to and in contact with said second ferromagnetic layer; and
    a layer of antiferromagnetic material adjacent to and in contact with said layer of magnetically soft material, said antiferromagnetic layer separated from said second ferromagnetic layer by said magnetically soft layer, said magnetically soft layer and said second ferromagnetic layer forming a bilayer in direct contact with said antiferromagnetic layer, said antiferromagnetic layer for providing a bias field in said bilayer thereby fixing the direction of the magnetization in said bilayer.

2. A magnetoresistive sensor as in claim 1 wherein said magnetically soft layer is comprised of an alloy of nickel-iron.

3. A magnetoresistive sensor as in claim 2 wherein said antiferromagnetic layer is comprised of an alloy of iron-manganese.

4. A magnetoresistive sensor as in claim 1 wherein said antiferromagnetic layer is comprised of a material selected from the group consisting of iron-manganese and nickel-manganese.

5. A magnetoresistive sensor as in claim 1 wherein said magnetically soft layer has a thickness of at least 10 angstroms.

6. A magnetoresistive sensor as in claim 5 where said magnetically soft layer has a thickness within the range of about 10 angstroms to about 40 angstroms.

7. A magnetoresistive sensor as in claim 1 wherein said antiferromagnetic layer has a thickness within the range of about 50 angstroms to about 150 angstroms.

8. A magnetoresistive sensor as in claim 1 wherein said first and second ferromagnetic layers have a thickness within the range of about 10 angstroms to about 150 angstroms.

9. A magnetoresistive sensor as in claim 1 wherein said nonmagnetic metallic spacer layer has a thickness less than the mean free path length of conduction electrons in said nonmagnetic metallic spacer layer.

10. A magnetoresistive sensor as in claim 9 wherein said nonmagnetic metallic spacer layer has a thickness within the range of about 10 angstroms to about 40 angstroms.

11. A magnetoresistive sensor as in claim 1 where in said nonmagnetic metallic spacer layer is comprised of a material selected from the group consisting of silver, gold, copper and alloys of silver, copper and gold.

12. A magnetoresistive sensor as in claim 11 wherein said nonmagnetic metallic spacer layer comprises a thin film layer of copper.

13. A method of fabricating a magnetoresistive sensor comprising the steps of:
    forming a layered magnetic structure on a substrate comprising first and second layers of ferromagnetic material separated by a spacer layer of nonmagnetic metallic material, said second ferromagnetic layer being of iron;
    depositing a layer of magnetically soft material directly over said second layer of ferromagnetic material;
    depositing a layer of antiferromagnetic material over and in direct contact with said layer of magnetically soft material;
    annealing said layered magnetic structure in air at a predetermined temperature for a predetermined length of time; and
    cooling said layered magnetic structure in a magnetic field.

14. The method of claim 13 wherein said magnetically soft material comprises nickel-iron.

15. A magnetic storage system comprising:
    a magnetic storage medium having a plurality of tracks for recording of data;
    a magnetic transducer maintained in a closely spaced position relative to said magnetic storage medium during relative motion between said magnetic transducer and said magnetic storage medium, said magnetic transducer including a magnetoresistive sensor comprising:
        a first and a second layer of ferromagnetic material separated by a spacer layer of nonmagnetic metallic material, said second ferromagnetic layer being of iron, the magnetization direction of said first layer of ferromagnetic material being substantially perpendicular to the magnetization direction of said second layer of ferromagnetic material at zero applied magnetic field;
        a layer of magnetically soft material adjacent to and in contact with said second ferromagnetic layer; and
        a layer of antiferromagnetic material adjacent to and in contact with said layer of magnetically soft material, said antiferromagnetic layer separated from said second ferromagnetic layer by said magnetically soft layer, said magnetically soft layer and said second ferromagnetic layer forming a bilayer in direct contact with said antiferromagnetic layer, said antiferromagnetic layer for providing a bias field in said bilayer thereby fixing the direction of the magnetization in said bilayer;
    actuator means coupled to said magnetic transducer for moving said magnetic transducer to selected tracks on said magnetic storage medium; and
    detection means coupled to said magnetoresistive sensor for detecting resistance change in said magnetoresistive material responsive to magnetic fields representative of data bits recorded in said magnetic storage medium intercepted by said magnetoresistive sensor.

16. A magnetic storage system as in claim 15 wherein said magnetically soft layer is comprised of an alloy of nickel-iron.

17. A magnetic storage system as in claim 15 wherein said antiferromagnetic layer is comprised of a material selected from the group consisting of iron-manganese and nickel-manganese.

18. A magnetic storage system as in claim 15 wherein said magnetoresistive sensor further comprises:

a capping layer deposited over said antiferromagnetic layer; and electrical lead means deposited over said capping layer for coupling said magnetoresistive sensor to said detection means.

19. A magnetic storage system as in claim 18 wherein said capping layer comprises a material selected from the group consisting of tantalum and zirconium.

* * * * *